July 7, 1931.   S. W. L. JOHNSON ET AL   1,813,164
JACK WITH AUTOMATIC WHEEL RETAINER
Filed Sept. 4, 1928
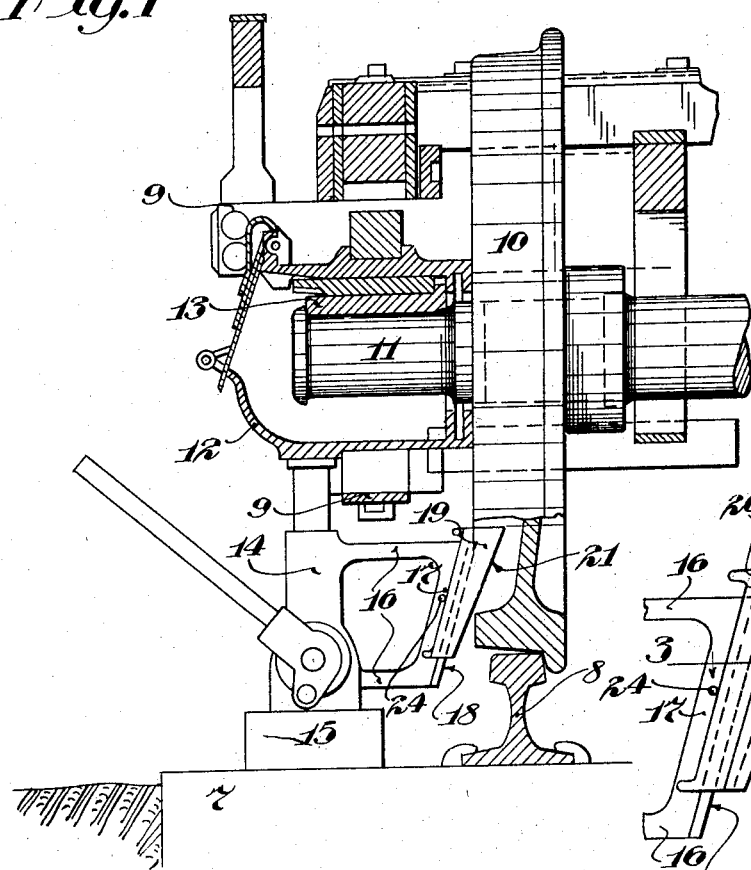
Fig.1
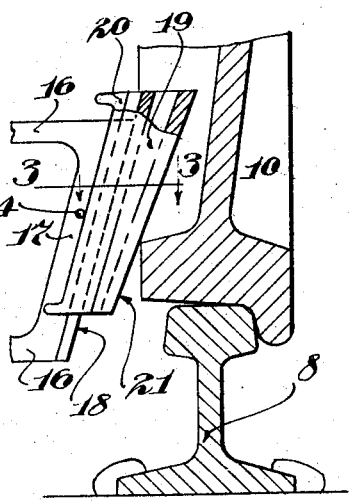
Fig.2
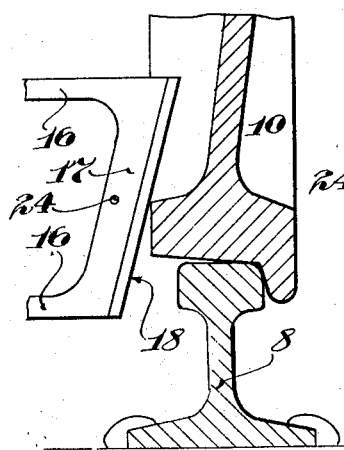
Fig.6
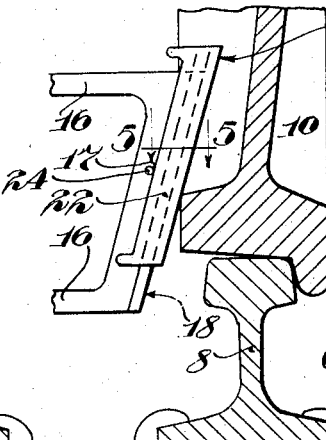
Fig.4
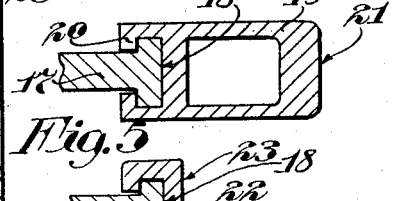
Fig.3
Fig.5
Inventors
Sigurd W. L. Johnson
Clement Zarembinsky
By their Attorneys
Merchant and Kilgore Patented July 7, 1931

1,813,164

UNITED STATES PATENT OFFICE

SIGURD W. L. JOHNSON AND CLEMENT ZAREMBINSKY, OF MINNEAPOLIS, MINNESOTA, ASSIGNORS OF ONE-THIRD TO HENRY M. ROBERTSON, OF ST. PAUL, MINNESOTA

JACK WITH AUTOMATIC WHEEL RETAINER

Application filed September 4, 1928. Serial No. 303,645.

Our invention has for its object to provide a lifting jack of any suitable type with an extremely simple and highly efficient automatic wheel retainer for use in holding one of the wheels of a car truck on a track rail while lifting its journal box for the purpose of removing the journal bearing for inspection or the substitution of a new one therefor.

It is well known that when lifting a journal box for the purpose of removing its bearing, said wheel will often lift from the track rail with the journal box as it is being raised by a jack, due to the weight on the journal box on the opposite side of the car truck and thereby prevents the removal of said bearing. By the embodiment of the improved automatic wheel retainer in a jack, the same is positioned to hold a wheel by the very act of positioning the jack under the journal box for the wheel and in case the jack settles under the weight it is sustaining, or is tilted by the tilting movement of the journal box in the car truck or in case the wheel or the jack or both move horizontally in respect to each other, said wheel retainer will always remain in position to automatically hold the wheel from lifting. The contact between the wheel and wheel retainer is such that said wheel or wheel retainer may move in respect to each other under the lifting action of the jack without danger of breaking or damaging said wheel retainer.

To the above end, generally stated, the invention consists of the novel device and combinations of devices hereinafter described and defined in the claims.

In the accompanying drawings, which illustrate the invention, like characters indicate like parts throughout the several views.

Referring to the drawings:

Fig. 1 is a fragmentary view of a railway track and a car truck with some parts shown in transverse vertical sections and also showing in side elevation a jack having the invention embodied therein, and positioned under the journal box for lifting the same and with the wheel retainer in position for holding the wheel on the track;

Fig. 2 is a fragmentary detail view partly in side elevation and partly in vertical section of the track, rail, wheel and wheel retainer, on an enlarged scale;

Fig. 3 is a detail view in section taken on the line 3—3 of Fig. 2, on an enlarged scale;

Fig. 4 is a view corresponding to Fig. 2 but showing a different form of shoe for the wheel retainer;

Fig. 5 is a detail view in section taken on the line 5—5 of Fig. 4, on an enlarged scale; and Fig. 6 is a view corresponding to Fig. 2 with the exception that the shoe is removed.

The numerals 7 and 8 indicate respectively, one of the ties and one of the rails of a railway track.

Of the parts of a car truck illustrated, it is important to note the frame 9, wheel 10 on the rail 8, journal 11, journal box 12, and bearing or brass 13. The lifting jack in which the invention is embodied is indicated as an entirety by the numeral 14 and is supported on a base block 15 which extends parallel to the rail 8 and rests transversely on two or more of the ties 7. The movable member of the jack 14, as shown, is in engagement with a boss on the under side of the journal box 12 outward of the frame 9.

The wheel retainer includes a bracket 16 cast integral with the body of the jack 14, projects laterally therefrom and has on its outer end an upwardly and outwardly inclined head 17. This head 17 is cast integral with the bracket 16, is T-shaped in cross section and has a flat outer bearing surface 18 that is oblique to the axis to the jack 14.

In Figs. 1, 2 and 3 there is illustrated an automatic slack take-up shoe 19 mounted on the oblique bearing surface 18 for vertical sliding movement. The back of this shoe 19 is channel shape in cross section, fits on to the head 17 and has on the sides thereof retaining flanges 20 which interlock with said head 16, as shown in Fig. 3 and holds the shoe 19 thereon with freedom for vertical sliding movement on the bearing surface 18. Said shoe 19 has a flat oblique outer bearing surface 21, the obliquity of which is greater than that of the bearing surface 18 and diverges upwardly and outwardly therefrom.

In positioning the jack 14 under the journal box 12, the bracket 16 is turned toward the wheel 10 which brings the slack take-up device with its shoe 19 in a position in which it inclines inwardly over the rim of said wheel for contact therewith, as shown in Figs. 1 and 2. The shoe 19 at the time the jack 14 is being positioned under the journal box 12 is held raised for contact with the wheel 10, near its lower end portion. The purpose of thus positioning the shoe 19 is to permit the same to automatically move downward under the action of gravity and take up any slack which may develop between the wheel 10 and jack 14.

In case the jack 14 settles under the weight it is sustaining, the head 17 will, of course, move therewith and slide downward in the shoe 19 which will be held in biting engagement with the wheel 10 under the pressure produced thereon by the oblique surface 18 acting on said shoe, and thereby hold the wheel 10 on the track 8. In case either the jack 14 or wheel 10 moves away from each other, or if both move and separate from each other, the shoe 19 will automatically move down under the action of gravity and thereby take up the slack between the head 17 and wheel 10 with a wedge action and hold said wheel on the track 8.

In certain types of car trucks, their journal boxes are mounted for limited angular movement in vertical planes transversely of the trucks. When lifting a journal box of this type, it is liable to tilt and cause the jack 14 to tilt outward and thereby move the head 17 away from the wheel 10. When this movement of the jack 14 takes place, the shoe 19 will be moved downward by gravity and engage the wheel with a wedge action to hold the same on to the track 8. By raising or lowering the shoe 19 on the head 17, the distance between its point of contact with the wheel 10 and the axis of the jack 14, may be varied at will, and permit the placing of said jack in different positions under the journal box 12 in order to secure the best hold thereon.

The shoe 22, shown in Figs. 4 and 5, is mounted on the heads 17 in the same manner as the shoe 19 and its bearing surface 23 is parallel to the bearing surface 18 on the head 17. In case slack develops between the wheel 10 and jack 14, said wheel will lift slightly from the rail 8 and move the shoe 22 upward therewith on the oblique surface 18 and which surface will move said shoe toward the wheel 10 and take up the slack and hold the wheel from further movement. In case the jack 14 settles, the head 17 will slide downward on the shoe 22 which will be held in biting engagement with the wheel 10 by the pressure produced thereon by the wedge action of the surface 18.

In Fig. 6 the wheel retainer is shown as used without a shoe and in which case the oblique bearing surface 18 has direct contact with the wheel 10. The action of the wheel retainer when used, as shown in Fig. 6, is the same as that when used with the shoe 22 with the exception of the above noted direct contact between the wheel retainer and wheel.

To prevent the shoes 19 and 22 from becoming detached from the heads 17 and lost, they are provided with upper and lower inwardly projecting stop lugs arranged to engage a cotter pin 24 on said head.

What we claim is:

1. A lifting jack having a laterally offset member with a relatively long straight oblique surface arranged, when the jack is positioned to lift a journal box, to incline inwardly over the rim of a wheel and extend above and below the same, said member being held in position by the lifting action of the jack.

2. A lifting jack having a laterally offset member and a shoe slidably mounted on said member and having a relatively long straight oblique surface, arranged when the jack is positioned to lift a journal box, to incline inwardly over the rim of a wheel and extend above and below the same, said member being held in position by the lifting action of the jack.

3. A lifting jack having a laterally offset member with an oblique surface, and a slack take-up shoe mounted on said member to slide over its oblique surface and also having a relatively long straight oblique surface arranged, when the jack is positioned to lift the journal box, to incline inwardly over the rim of a wheel and extend above and below the same, the oblique surface of the shoe having a greater obliquity than the oblique surface on said member, said member being held in position by the lifting action of the jack.

4. A lifting jack having a shoe guide that is oblique to the axis thereof, and a shoe mounted on the guide and having a relatively long oblique wheel rim engaging part arranged, when the jack is positioned to lift a journal box, to incline inwardly and over the rim of a wheel and extend above and below the same.

5. The structure defined in claim 4 in which the obliquity of the wheel rim engaging part of the shoe is greater than that of its guide.

6. A lifting jack having a relatively long oblique wheel rim engaging part arranged, when the jack is positioned to lift a journal box, to incline inwardly and over the rim of a wheel and extend above and below the same with freedom to slide on the rim of the wheel in case the jack settles.

7. A lifting jack having a shoe guide, a shoe mounted on the guide for free floating movement and having a relatively long oblique wheel rim engaging part arranged, when the jack is positioned to lift a journal box, to incline inwardly and over the rim of a wheel and extend above and below the same with freedom to slide with respect to the guide in case the jack settles.

In testimony whereof we affix our signatures.

SIGURD W. L. JOHNSON.
CLEMENT ZAREMBINSKY.